United States Patent
Lu (10) Patent No.: US 7,334,946 B2
(45) Date of Patent: Feb. 26, 2008

(54) PASSIVELY ALIGNED OPTICAL-ELECTRICAL INTERFACE WITH MICROLENSES

(75) Inventor: Daoqiang Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 11/313,534

(22) Filed: Dec. 21, 2005

(65) Prior Publication Data

US 2007/0140627 A1 Jun. 21, 2007

(51) Int. Cl.
*G02B 6/42* (2006.01)
(52) U.S. Cl. .......................... 385/88; 385/52
(58) Field of Classification Search ............. None
See application file for complete search history.

(56) References Cited

U.S. PATENT DOCUMENTS

| | | | |
|---|---|---|---|
| 4,943,136 A | 7/1990 | Popoff | |
| 4,944,568 A | 7/1990 | Danbach et al. | |
| 5,359,686 A | 10/1994 | Galloway et al. | |
| 5,913,002 A * | 6/1999 | Jiang | 385/88 |
| 6,572,278 B2 * | 6/2003 | Hsieh et al. | 385/88 |
| 6,676,302 B2 * | 1/2004 | Cheng et al. | 385/88 |
| 6,729,771 B2 * | 5/2004 | Kim et al. | 385/76 |
| 6,739,766 B2 * | 5/2004 | Xu et al. | 385/93 |
| 6,792,171 B2 * | 9/2004 | Hargis et al. | 385/14 |
| 6,834,133 B1 | 12/2004 | Towle et al. | |
| 6,915,049 B2 * | 7/2005 | Murata | 385/52 |
| 2004/0126058 A1 | 7/2004 | Lu et al. | |
| 2004/0126064 A1 | 7/2004 | Vandentop et al. | |
| 2004/0190831 A1 | 9/2004 | Lu et al. | |
| 2005/0036728 A1 | 2/2005 | Braunisch | |

OTHER PUBLICATIONS

Mohammed, E. M. et al., "Optical I/O technology for digital VLSI," Proceedings of SPIE, vol. 5358, (2004), pp. 60-70, no month.
Towle, S. et al., "Methods and Apparatus to Optically Couple an Optoelectronic Chip to a Waveguide," U.S. Appl. No. 10/664,475, filed Sep. 17, 2003.
Braunisch, H. et al., "Waveguide Coupling Mechanism,"U.S. Appl. No. 10/934,858, filed on Sep. 3, 2004.
Lu, D. et al., "Optical Package," U.S. Appl. No. 10/954,903, filed on Sep. 30, 2004.
Towle, S. et al., "On-Substrate Microlens to Couple an Off-Substrate Light Emitter and/or Receiver with an On-Substrate Optical Device," U.S. Appl. No. 10/955,553, filed on Sep. 30, 2004.

(Continued)

*Primary Examiner*—Rodney Bovernick
*Assistant Examiner*—Mike Stahl
(74) *Attorney, Agent, or Firm*—Blakely, Sokoloff, Taylor & Zafman LLP (57) ABSTRACT

An optical-electrical interface for interfacing optical signals with electrical signals. The optical-electrical interface includes an alignment interface for receiving an external waveguide connector from a first side. The alignment interface includes an alignment structure to mate with a corresponding alignment structure of the external waveguide connector to passively align the external waveguide connector. A first microlens is disposed on the first side of the alignment interface. A second microlens is disposed on a second side of the alignment interface. An optical path passes through the alignment interface between the first microlens and the second microlens. A conductor is disposed on the second side of the alignment interface.

17 Claims, 8 Drawing Sheets

OTHER PUBLICATIONS

Towle, S. et al., "Manufacturable Connectorization Process for Optical Chip-to-Chip Interconnects," U.S. Appl. No. 10/955,897, filed on Sep. 30, 2004.

Mohammed, E., "Surface Mount (SMT) Connector for VCSEL and Photodiode Arrays," U.S. Appl. No. 10/971,234, filed on Oct. 22, 2004.

Lu, D. et al., "Passively Aligned Optical-Electrical Interface," U.S. Appl. No. 11/096,504, filed on Mar. 29, 2005.

Lu, D. et al., "Flip-Chip Mountable Optical Connector For Chip-To-Chip Optical Interconnectability," U.S. Appl. No. 11/124,033, filed on May. 6, 2005.

* cited by examiner

PASSIVELY ALIGNED OPTICAL-ELECTRICAL INTERFACE WITH MICROLENSES

TECHNICAL FIELD

This disclosure relates generally to optical-electrical interfaces, and in particular but not exclusively, relates to passively aligned optical-electrical interfaces.

BACKGROUND INFORMATION

As the power of processing devices exponentially increases, high bandwidth communication links interconnecting these processing devices are increasingly important. Optical media or carriers are capable of providing such high bandwidth communication links. To utilize optical carriers, optical-electrical interfaces are needed to interface the optical realm of the carrier with the electrical realm of the processing devices.

One type of optical-electrical interface uses a waveguide embedded within a substrate having a multi-terminal ("MT") connector to form a make and break connection with an external waveguide. The substrate may support a variety of electrical devices that interface with the embedded waveguide via an optoelectronic die. The optoelectronic die is electrically coupled to the substrate while at the same time carefully positioned to optically align with micro-mirrors integrated into the end of the embedded waveguide. These optical-electrical interfaces are generally manufactured using distinct components, which are fabricated separately, and cumbersomely assembled.

Known optical-electrical interfaces, such as the one described above, use active alignment techniques to obtain the necessary alignment precision. Active alignment entails manually aligning the optoelectronic die with the embedded waveguide while the optical-electrical interface is stimulated and observed with a photodetector or microscope for sufficient alignment. Manual active alignment is people intensive and does not lend itself well to high volume manufacturing ("HVM").

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus, method of high-volume manufacture, and system for implementing a passively aligned optical-electrical interface with microlens are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
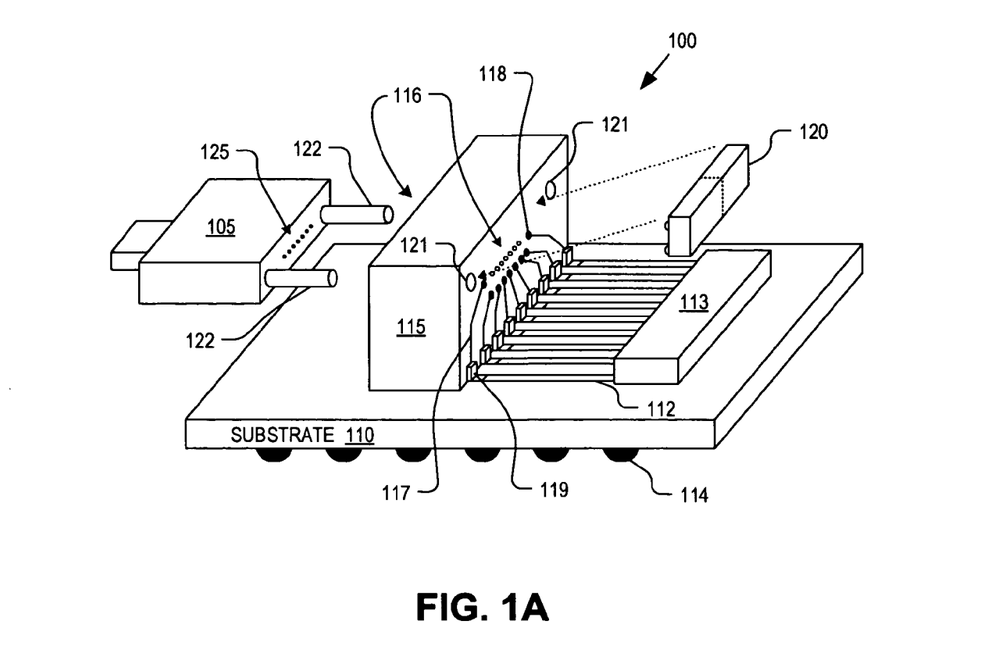
FIG. 1A is a perspective view diagram illustrating an optical-electrical interface capable of passively aligning an optoelectronic die with an external waveguide, in accordance with an embodiment of the invention.

FIG. 1A is a perspective view diagram illustrating an optical-electrical interface ("OEI") 100 for coupling to an external waveguide connector 105 and to a substrate 110, in accordance with an embodiment of the invention. OEI 100 provides a low profile optical-electrical interface that is passively aligned and capable of implementing a make and break connection with external waveguide connector 105.

The illustrated embodiment of OEI 100 includes an alignment interface 115 and an optoelectronic (OE) die 120. It should be appreciated that the figures herein are not drawn to scale, but rather are merely intended for illustration. In some cases, only one or two instances of a component/element have been labeled so as not to clutter the drawings. Substrate 110 includes conductor traces 112 disposed on its surface and may further include various circuit chips 113 (e.g., trans-impedance amplifier ("TIA"), vertical cavity surface emitting laser ("VCSEL") driver, logic chips, complementary metal oxide semiconductor ("CMOS") chips, etc.) electrically connected to conductor traces 112. Alignment interface 115 includes microlenses 116, conductor traces 117, conductor pads 118 and 119, and alignment structures 121. The illustrated embodiment of external waveguide connector 105 includes one or more external waveguides 125 and alignment structures 122 for mating with alignment structures 121.

Figure 1B:
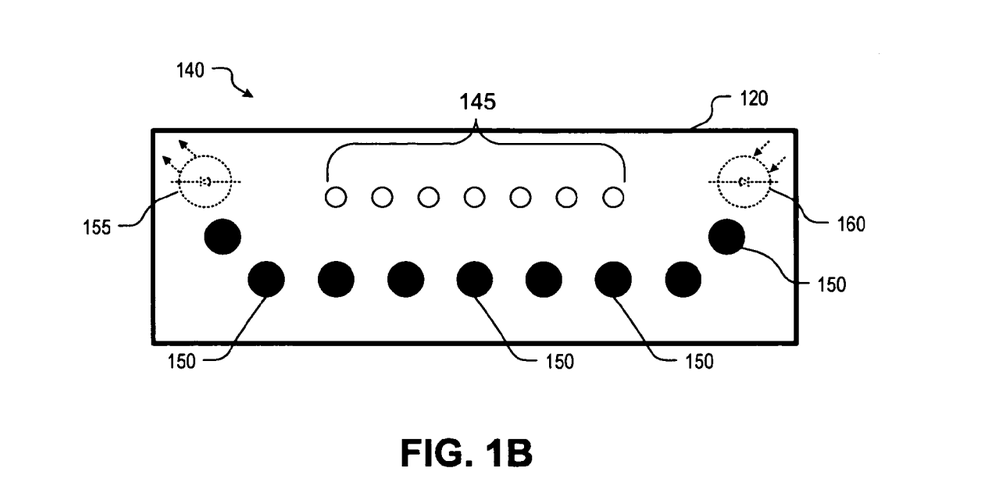
FIG. 1B is a block diagram illustrating a backside view of an optoelectronic die, in accordance with an embodiment of the invention.

FIG. 1B is a block diagram illustrating a backside 140 of OE die 120, in accordance with an embodiment of the invention. The illustrated embodiment of backside 140 includes an array of optical ports 145 and electrical ports 150 (only a portion of which are labeled). OE die 120 is an interface point for converting signals between the electrical and optical realms. As such, one or more optical sources 155 and/or one or more optical detectors 160 may be integrated within OE die 120.

When external waveguide connector 105 is inserted into OEI 100, the components of OEI 100 interact as follows. Alignment structures 122 of external waveguide connector 105 are shaped to securely mate with alignment structures 121 of alignment interface 115. In one embodiment, alignment structures 121 and 122 mate to passively align external waveguides 125 housed within external waveguide connector 105 with microlenses 116. Although FIG. 1A illustrates alignment structures 121 and 122 as being cavity and pin structures, it should be appreciated that other male and female coupling shapes may be used as well.

When OE die 120 is fixed to the opposite side of alignment interface 115, optical ports 145 are aligned with microlens 116 as well. Once both external waveguide connection 105 and OE die 120 are mounted to alignment interface 115, optical signals can be communicated through alignment interface 115 via microlenses 116 disposed on both sides of alignment interface 115.

In one embodiment, OE die 120 is a semiconductor material, such as silicon, gallium arsenide, other III-V semiconductors, or the like. OE die 120 includes integrated optoelectronic devices, such as optical source 155 and optical detector 160. One or more optical sources 155 may be electrically coupled and responsive to a portion of electrical ports 150 to generate optical signals for launching into external waveguides 125 via optical ports 145. In turn, electrical ports are coupled to conductor pads 118 via electrical connections, such as solder bumps, other surface mount connections, or the like. Conductor pads 118 couple to conductor traces 117, conductor pads 119, and conductor traces 112, in turn, for coupling electrical signals from external electrical devices mounted on substrate 110. While a portion of conductor traces 112 may deliver electrical signals into OE die 120 for modulating optical sources 155, a portion may also deliver power for driving optical sources 155.

One or more optical detectors 160 may also be integrated into OE die 120 for receiving optical signals from external waveguides 125 and for generating electrical signals in response thereto. Optical detectors 160 may be coupled to another portion of electrical ports 150 to deliver the generated electrical signals to the external electronic devices disposed on substrate 110 via conductor traces 117 and 112. Accordingly, a portion of conductor traces 112 may carry electrical signals from optical detectors 160 or deliver power into OE die 120 for operating optical detectors 160.

In one embodiment, two separate OE dies 120 are mounted to the side of alignment interface 115 (illustrated by the dotted line separating OE die 120 in FIG. 1A), one OE die including optical sources 155 and the other OE die including optical detectors 160. Two distinct OE dies 120 enables optical sources 155 and optical detectors 160 to be implemented in different semiconductor materials (e.g., silicon based optical detectors 160 and gallium arsenide based optical sources 155) and thereby tailored for specific use cases and manufacturing processes. Alternatively, OEI 100 may be implemented as just an optical-to-electrical receiver including only one or more optical detectors 160 or implemented as just an electrical-to-optical transmitter including only one or more optical sources 155. Otherwise, OEI 100 may be a transceiver including both optical sources 155 and optical detectors 160 integrated within a single OE die 120 or multiple OE dies 120.

In yet other embodiments, OEI 100 may further include additional dies such as laser driver chips, transimpedance amplifiers ("TIAs"), and/or limiting amplifier ("LIA") chips, interconnected with OE die 120 and substrate 110 via appropriately routed conductor traces 117 and 112. For example a TIA may be mounted on the side of alignment interface 115 with conductor traces routed to interconnect the TIA both to OE die 120 and to circuit chip 113. Alternatively, the TIA could be mounted directly on substrate 110 (e.g., circuit chip 113).

Optical sources 155 may be made of any light producing device, including semiconductor lasers, direct electrically modulated lasers, lasers with integrated modulators, quantum well or quantum dot devices such as vertical cavity surface emitting lasers ("VCSELs"), edge emitting lasers, and the like. Optical detectors 160 may be made of any light responsive device, including semiconductor optical detectors, such as photodiodes, and the like.

Substrate 110 may be a circuit board, motherboard, a circuit package, and the like. In one embodiment, substrate 110 is a ball grid array ("BGA") having solder bumps 114 disposed on its underside for surface mounting to a circuit board. Substrate 110 may be formed of any rigid material capable of supporting conductor traces 112 and alignment interface 115 thereon. For example, substrate 110 may be made of dielectric materials, organic materials, ceramic materials, semiconductor materials, silicon, gallium arsenide, and the like.

External waveguide connector 105 may include any type of optical connector for housing one or more external waveguides 125 therein. In one embodiment, external waveguide connector 105 is a multi-terminal ("MT") connector capable of "make and break" connections with alignment interface 115. Alignment interface 115 may be fabricated of any rigid material (e.g., quartz, glass, transparent/translucent polymers, etc.) capable of supporting external waveguide connector 105 with sufficient strength and precision.

Figure 1C:
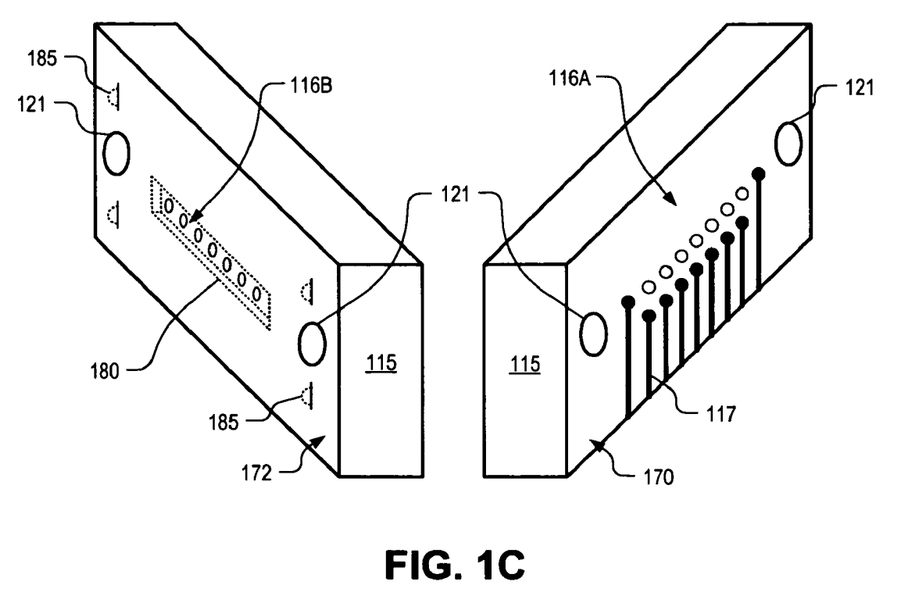
FIG. 1C is a perspective view diagram illustrating an alignment interface capable of passively aligning an optoelectronic die with an external waveguide, in accordance with an embodiment of the invention.
Figure 1D:
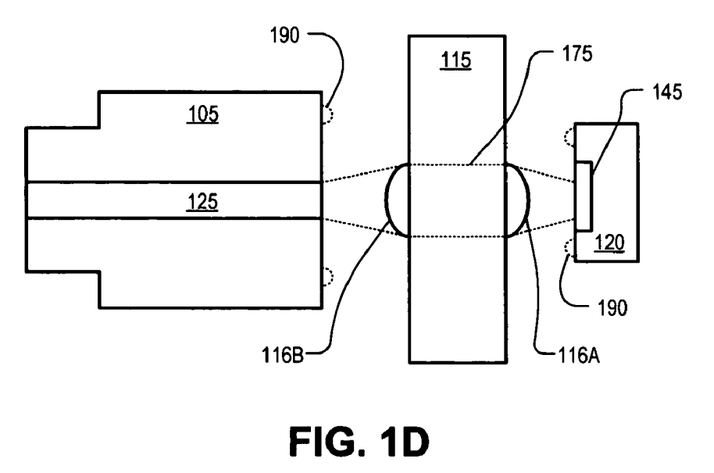
FIG. 1D is a side view block diagram illustrating microlens disposed on an alignment interface for focusing optical signals transmitted between an external waveguide and an optoelectronic die, in accordance with an embodiment of the invention.

FIG. 1C is a perspective view diagram illustrating both sides of alignment interface 115 and FIG. 1D is a crosssectional view of alignment interface 115, in accordance with an embodiment of the invention. As illustrated, one or more microlenses 116A may be disposed on a first side 170 of alignment interface 115 and one or more corresponding microlenses 116B may be disposed on a second side 172 of alignment interface 115. Microlenses 116A are optically coupled to corresponding microlenses 116B via optical paths 175 passing through alignment interface 115. In one embodiment, alignment interface 115 is fabricated of an optically transmissive material, such as glass, quartz, optically transmissive polymer, or the like. The material used to form optical paths 175 through alignment interface 115 and/or the entire alignment interface 115 itself may be optically transmissive at a wide range of wavelengths (e.g., 850 nm, 1310 nm, 1550 nm, etc.) or optically transmissive at a single narrow range.

In an embodiment where OE die 120 includes optical source 155, microlens 116A operates to collimate an optical signal output from OE die 120. The collimated optical signal is then transmitted through alignment interface 115 along optical path 175 to microlens 116B. Microlens 116B focuses the collimated light on to the end of external waveguide 125 and launches the optical signal therein. In an embodiment wherein OE die 120 includes optical detector 160, microlens 116B operates to collimate an optical signal output from external waveguide 125. The collimated optical signal is then transmitted through alignment interface 115 along optical path 175 to microlens 116A. Microlens 116A focuses the collimated light on to optical port 145 for transmission to the optical detector integrated within OE die 120. It should be appreciated that OE die 120 may include both optical sources and optical detectors each coupled to a different microlens 116A or even sharing a single optical port 150 and microlens 116A.

As illustrated in FIG. 1D, when OE die 120 and external waveguide connector 105 are mounted to alignment interface 115, OE die 120 and external waveguide connector 105 do not physically touch microlenses 116 to prevent scratching or damage. Physical contact may be prevented using a variety of techniques. For example, microlenses 116A and 116B may be disposed within a recess 180. Alternatively, protrusions 185 may be formed on surfaces 170 and 172 of alignment interface 115. In yet another embodiment, protrusions 190 may be formed on external waveguide connector 105 and OE die 120, as well. Other techniques to prevent physical contact may be used.

Figure 2:
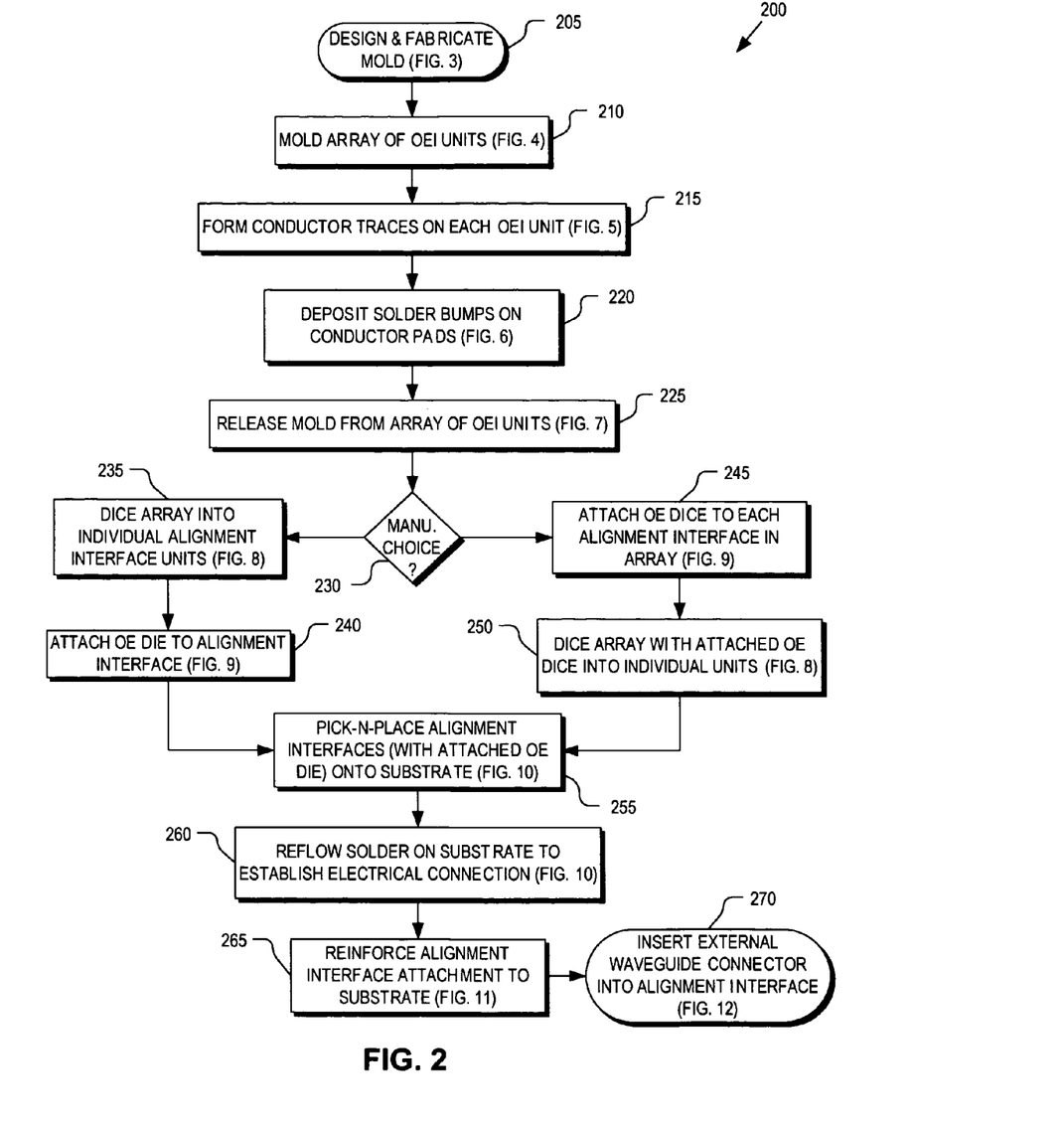
FIG. 2 is a flow chart illustrating a process for high-volume manufacturing of optical-electrical interfaces, in accordance with an embodiment of the invention.

FIG. 2 is a flow chart illustrating a process 200 for high-volume manufacturing ("HVM") of OEIs 100, in accordance with an embodiment of the invention. Process 200 is described below with reference to FIGS. 3-12. The order in which some or all of the process blocks below appear in process 200 should not be deemed limiting. Rather, one of ordinary skill in the art having the benefit of the present disclosure will understand that some of the process blocks may be executed in a variety of orders not illustrated, or even skipped all together. A number of fabrication techniques may be used to build OEI 100. The process 200 details only one such technique using injection molding with optically transmissive polymer or plastic. Other techniques will be briefly described later.

Figure 3:
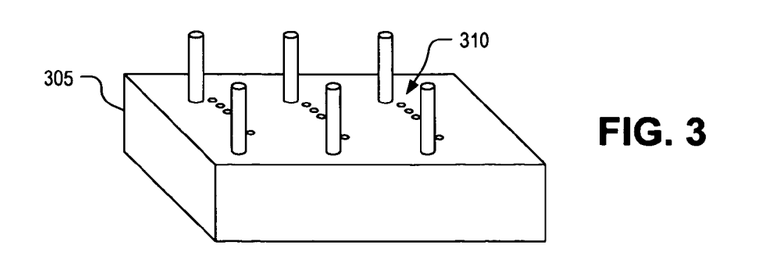
FIG. 3 illustrates a portion of a portion of a mold used to manufacture an array of alignment interfaces with microlens, in accordance with an embodiment of the invention.

In a process block 205 (FIG. 3), a mold 305 is designed and manufactured for fabricating an array 405 of alignment interfaces 115. Mold 305 may be designed to fabricate anywhere from one to a plurality (e.g., hundreds) of individual alignment interfaces 115 in a single fabrication cycle. Mold 305 may be designed and built using standard techniques known in the art of HVM. The illustrated embodiment of mold 305 represents only a bottom half of the mold. Mold 305 includes microlens molds 310 for forming microlenses 116.

Figure 4:
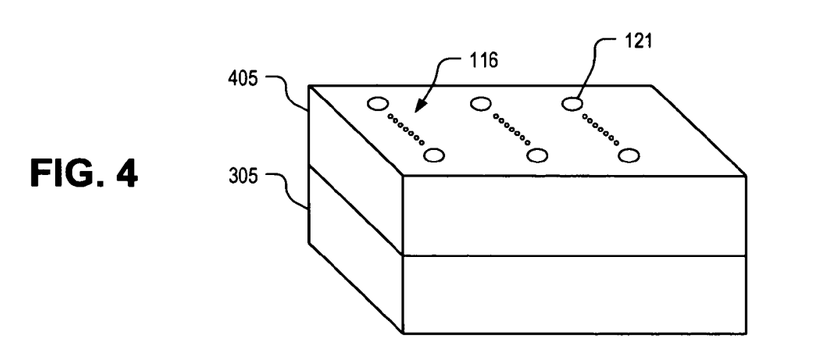
FIG. 4 illustrates an array of alignment interfaces formed in a mold during manufacture of an optical-electrical interface, in accordance with an embodiment of the invention.

In a process block 210 (FIG. 4), mold 305 is used to fabricate array 405. In one embodiment, array 405 is formed by precision molding using plastic injection techniques. For example, array 405 may be formed using optically transmissive polymer or plastic injection techniques having tolerances of 2-3 µm. These tolerances are well within tolerances acceptable to align optical ports 145 with external waveguides 125. For example, in an embodiment where external waveguides 125 have core diameters of 50 µm, optical sources 155 have optical apertures of 10 µm, and optical detectors have apertures of 60 µm, tolerances of 2-3 µm for fabricating alignment interface 115 is acceptable to obtain adequate optical alignment for launching and receiving optical signals to/from external waveguides 125. Mold 305 is used to form microlenses 116 on alignment interface 115. In one embodiment, microlenses 116 have a diameter of approximately 200 µm.

Figure 5:
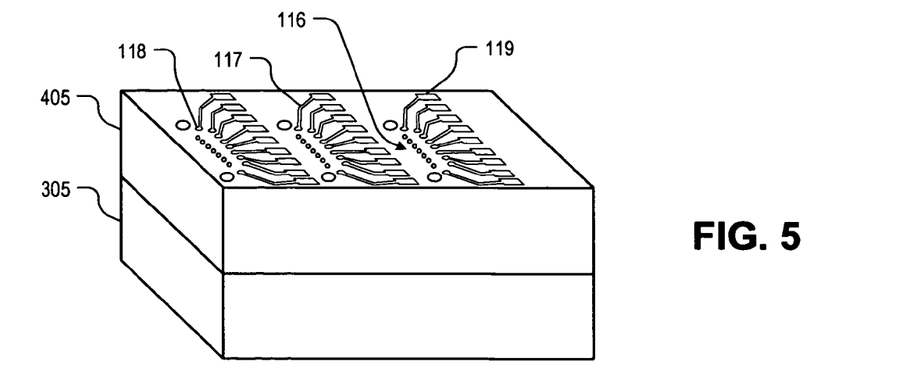
FIG. 5 illustrates formation of conductor traces and conductor pads on an array of alignment interfaces during manufacture of an optical-electrical interface, in accordance with an embodiment of the invention.

Once array 405 is formed, conductor traces 117 and conductor pads 118 and 119 (only a portion of which are labeled) are formed on the surface of array 405 (process block 215, FIG. 5). Sets of conductor traces 117 and conductor pads 118 and 119 are formed for each alignment interface 115 of array 405. For example, each alignment interface 115 may include 20 to 50 conductor traces 117 and corresponding conductor pads 118 and 119 for coupling to electrical ports 150 of OE die 120. However, it should be appreciated that the number of conductor traces 117 and corresponding conductor pads 118 and 119 may be varied to provide any number of electrical signals and power connections to OE die 120. In one embodiment, conductor traces 117 and conductor pads 118 and 119 are formed using photolithography.

In general, it is desirable to control the characteristic impedance of conductor traces 117 to match a predefined value. Impedance control can be achieved in planar transmission line design using a single metallization layer and co-planar waveguide ("CPW") technology. Transmission lines requiring multiple metallization layers such as microstrips and strip lines can be realized using standard high-density interconnect ("HDI") buildup processes, for example, using an Ajinomoto Buildup Film ("ABF") and laser drilling/plating for via formation. Furthermore, it may be beneficial to add a solder resist layer with solder resist openings at the locations of conductor pads 118 and 119.

As can be seen from FIG. 5, conductor pads 118 are formed with a finer separation pitch than conductor pads 119. Conductor traces 117 fanout from conductor pads 118 to conductor pads 119 to transition from the fine-pitch integration of OE die 120 to the coarse-pitch conductor traces 112 of substrate 110. Standard technology conductor traces 112 may have widths and separation pitches constrained by impedance matching, cross-talk, parasitic circuit elements, and linear resistances. For example, conductor pads 118 may have a separation pitch of 125 µm, while conductor pads 119 may have a separation pitch of 200-500 µm.

Figure 6:
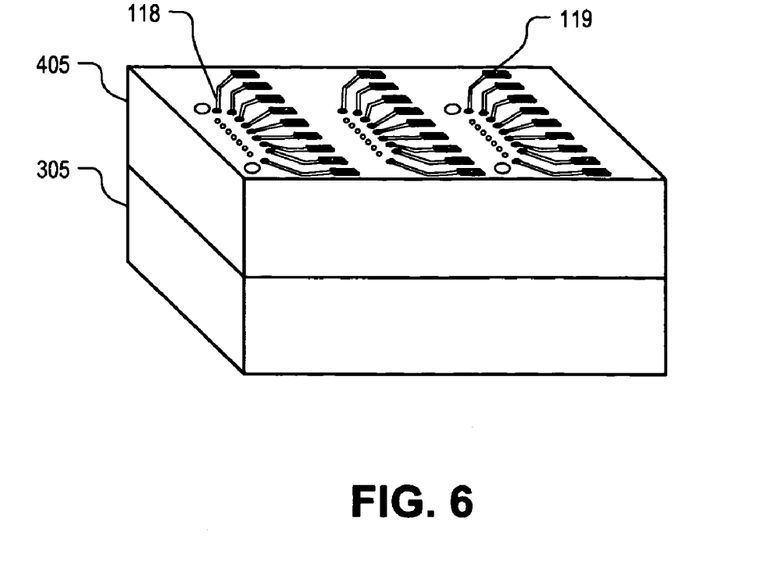
FIG. 6 illustrates placement of solder on conductor pads during manufacture of an optical-electrical interface, in accordance with an embodiment of the invention.

In a process block 220 (FIG. 6), solder is placed on conductor pads 118 and 119. In one embodiment, solder bumps are formed on conductor pads 118 and solder domes are formed on conductor pads 119.

Figure 7:
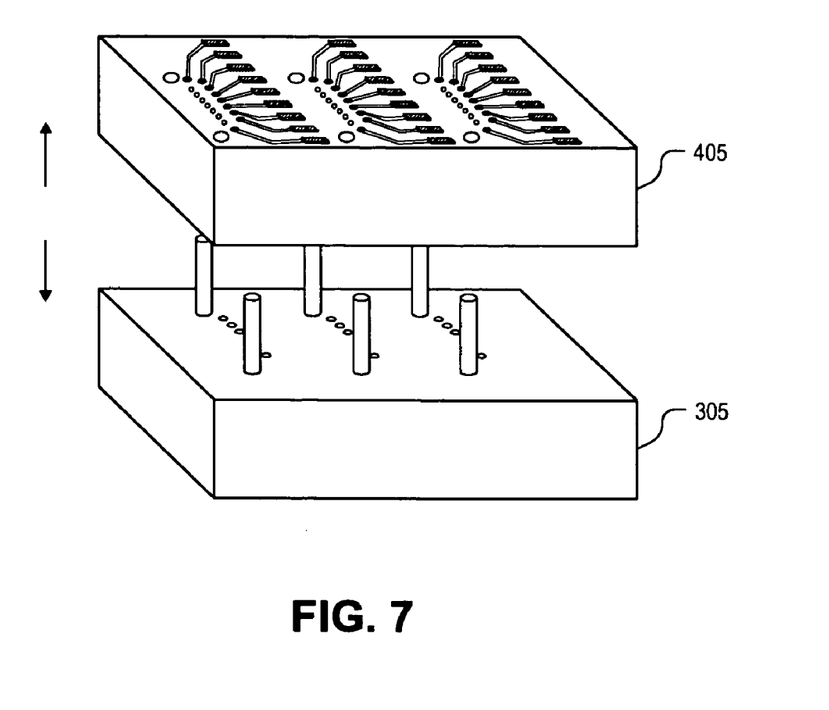
FIG. 7 illustrates separation of an array of alignment interfaces from a mold during manufacture of an optical-electrical interface, in accordance with an embodiment of the invention.
Figure 8:
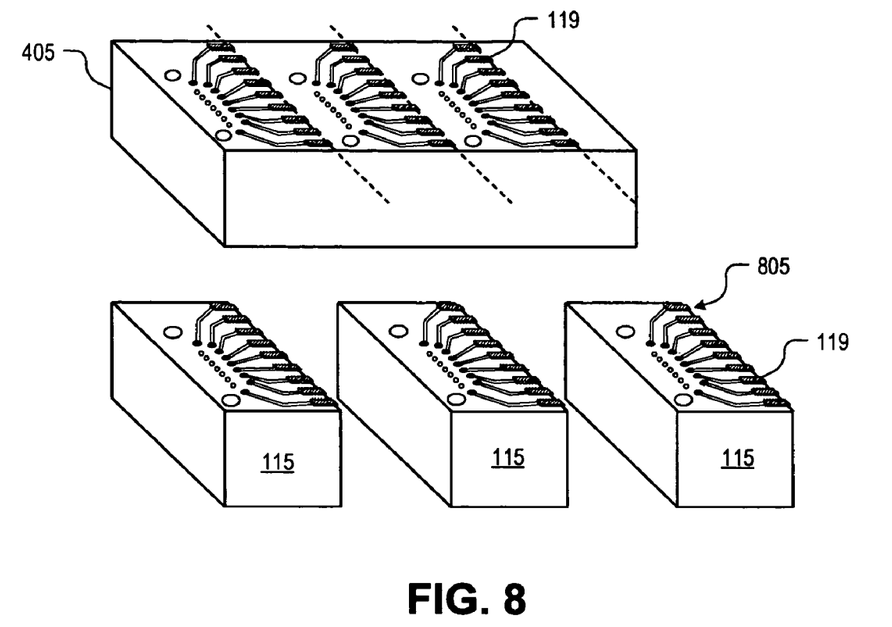
FIG. 8 illustrates dicing an array of alignment interfaces into individual alignment interfaces during manufacture of an optical-electrical interface, in accordance with an embodiment of the invention.
Figure 9:
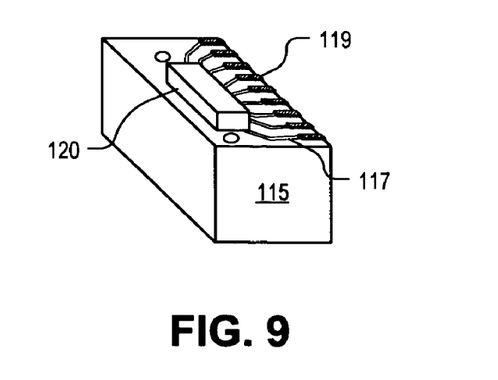
FIG. 9 illustrates mounting an optoelectronic die to an alignment interface during manufacture of an optical-electrical interface, in accordance with an embodiment of the invention.

In a process block 225 (FIG. 7), array 405 is released from mold 305. Once array 405 is freed from mold 305, a manufacturing choice (decision block 230) may be made. This choice includes whether to first dice array 405 into individual alignment interfaces 115 (process block 235, FIG. 8) and then attach OE die 120 to each individual alignment interface 115 (process block 240, FIG. 9) or whether to first attach an OE die 120 to each alignment interface 115 in array 405 (process block 245, FIG. 9) and then dice the combined pieces (process block 250, FIG. 8).

In process blocks 235 or 250 (FIG. 8), array 405 is diced along dicing locations which pass through conductor pads 119 having solder placed thereon. By dicing through conductor pads 119 after solder has been laid down, a solder straight edge 805 is cut through the hardened solder. Solder straight edge 805 provides a flat surface for butt connecting each conductor pad 119 to corresponding conductor traces 112 on substrate 110 (described below in connection with process block 260).

In process blocks 240 and 245 (FIG. 9), OE die 120 is mounted to alignment interface 115. In one embodiment, OE die 120 is mounted by depositing solder bumps on electrical ports 150 of OE die 120 and reflowing the solder bumps when OE die 120 is aligned and placed in contact with conductor pads 118 of alignment interface 115. Although the separation pitch between conductor pads 118 is considerably smaller than that of conductor pads 119, surface tension created when the solder bumps and/or solder deposited on conductor pads 118 are reflowed passively encourages alignment between electrical ports 150 on backside 140 of OE die 120 and conductor pads 118. The surface tension acts to pull the two conducting surfaces into position. Since backside 140 of OE die 120 and conductor pads 118 are formed with highly accurate lithography techniques, alignment of electrical ports 150 with conductor pads 118 results in accurate positioning of optical ports 145 such that the optical apertures of optical ports 145 will align with microlenses 116.

Figure 10:
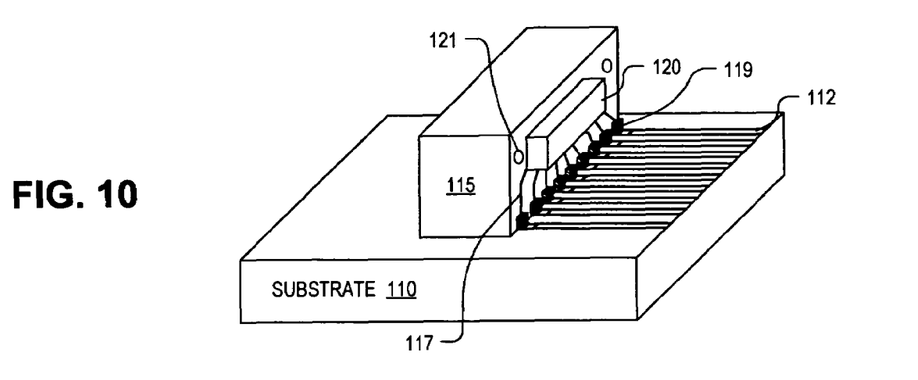
FIG. 10 illustrates mounting an alignment interface to a substrate during manufacture of an optical-electrical interface, in accordance with an embodiment of the invention.

Once array 405 has been diced and OE dice 120 mounted to the individual alignment interfaces 115, the combined unit (OEI 100) can be positioned onto substrate 110 using pick-n-place techniques or the like (process block 255, FIG. 10). Since the separation pitch between conductor traces 112 is larger than that of conductor pads 118, the precision need to pick-n-place alignment interface 115 and OE die 120 onto substrate 110 is less stringent. In a process block 260, the solder applied to conductor pads 119 is reflowed to establish an electrical connection between conductor traces 117 and 112. Again, the surface tension created by the liquefied solder acts to encourage alignment between the conductor traces. In one embodiment, solder paste may also be pre-applied to conductor traces 112 on substrate 110 prior to pick-n-place and reflow. In one embodiment, the solder used to connect conductor traces 117 to conductor traces 112 has a lower melting point than the solder used for attaching OE die 120 to alignment interface 115 (FIG. 9) to prevent reflow of solder applied to conductor pads 118 and releasing OE die 120.

Figure 11:
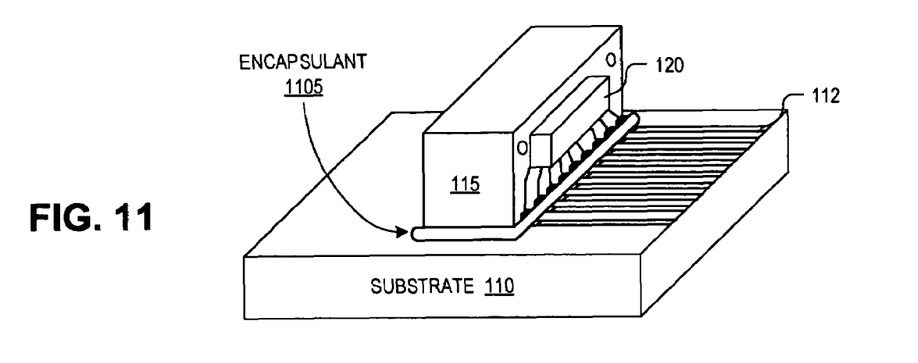
FIG. 11 illustrates reinforcement of an alignment interface to a substrate during manufacture of an optical-electrical interface, in accordance with an embodiment of the invention.

In a process block 265 (FIG. 11), the surface mount joint between alignment interface 115 and substrate 110 is reinforced by application of an encapsulant 1105. Encapsulant 1105 may include any adhesive capable of rigidly securing alignment interface 115 to substrate 110 after curing. Encapsulant 1105 may be cured by heat, light, UV radiant energy, or other techniques. Once cured, encapsulant 1105 should be capable of withstanding the stresses associated with repeated make-and-break attachment of external waveguide connector 105 to alignment interface 115. In one embodiment, encapsulant 1105 is an epoxy-based liquid adhesive applied around the base of alignment interface 115.

Figure 12:
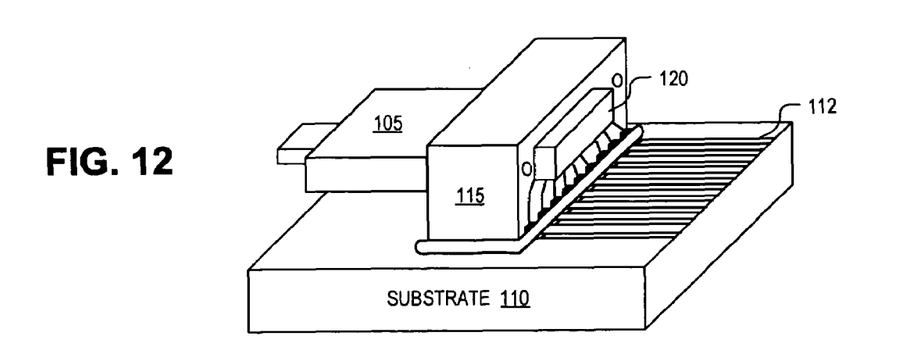
FIG. 12 illustrates attachment of an external waveguide connector to an optical-electrical interface, in accordance with an embodiment of the invention.

Finally, in a process block 270 (FIG. 12), external waveguide connector 105 coupled to alignment interface 115 by mating alignment structures 122 with alignment structures 121 to establish a passively aligned, optically butt coupled connection between external waveguides 125 and optical ports 145 through microlenses 116. It should be appreciated that the make-and-break connection established in process block 270 may be repeated many times, as needed in the field, and does not require time consuming active alignment.

Other techniques may be used to fabricate alignment interface 115. For example, if alignment interface 115 is fabricated of quartz or glass, then alignment interface 115 may be precisely machined using mechanical and laser processes. Similarly, microlenses 116 may be formed on alignment interface 115 using other techniques than injection molding. For example, microlenses 116 may be deposited onto alignment interface 115 using polymer inkjet printing techniques. Alternatively, microlenses 116 may be micro-machined. In one embodiment, microlenses 116 are fabricated using thermoplastic polymer. In this embodiment, a layer of polymer is spin coated onto the surface of alignment interface 115. The polymer layer is then dried and patterned. Subsequently, the patterned pieces of the polymer layer are reheated, causing the thermoplastic polymer to coalesce into a microlens shape due to the liquefied surface tension.

Figure 13:
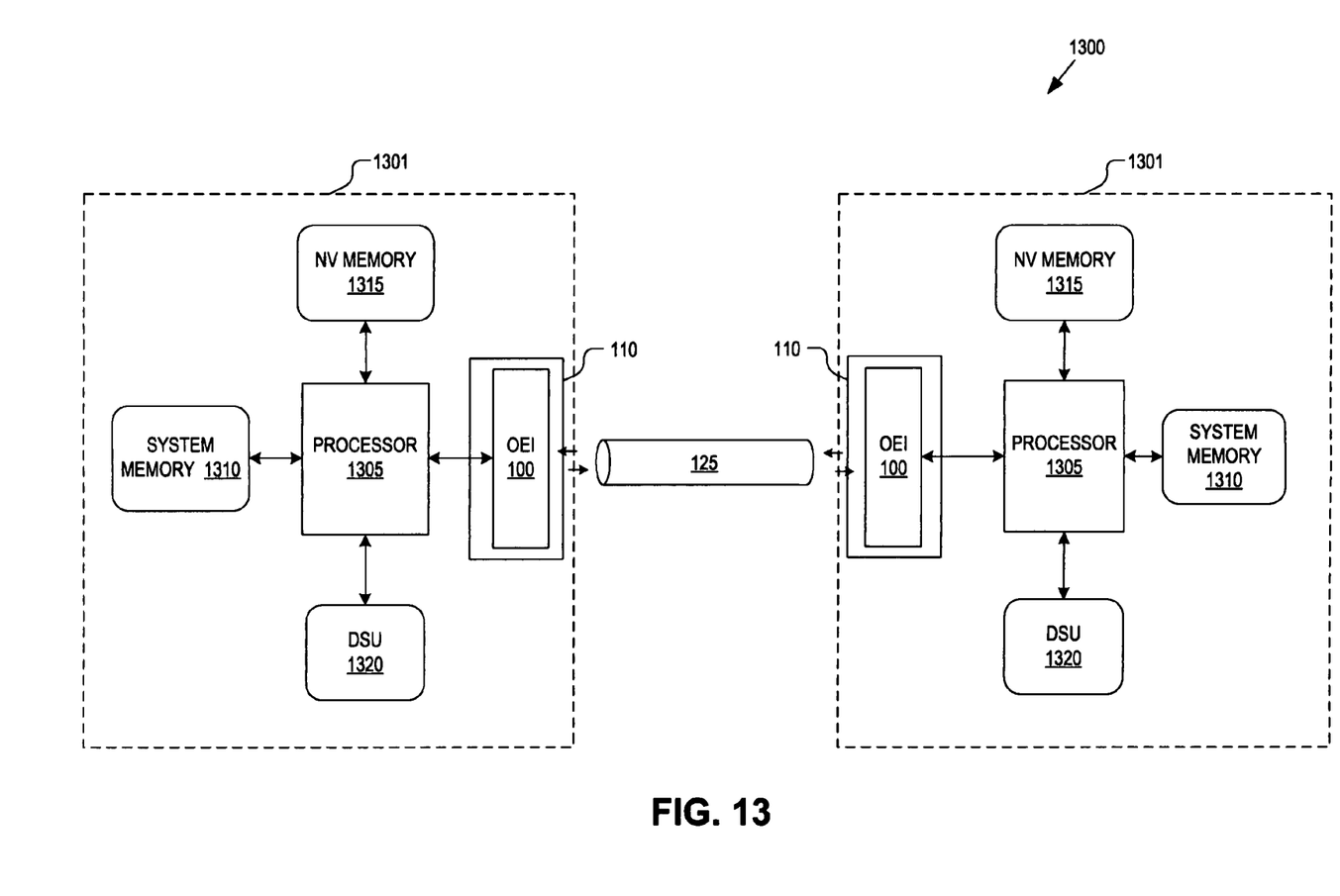
FIG. 13 is a block diagram illustrating a demonstrative system in which embodiments of the invention are implemented.

FIG. 13 is a block diagram illustrating a demonstrative system 1300 in which embodiments of the invention are implemented. System 1300 includes processing devices 1301 communicatively coupled via external waveguides 125. Processing devices 1301 may represent distinct computing systems (e.g., desktop computers, notebook computers, workstations, handheld computers, servers, processing blades, or the like). Alternatively, processing devices 1301 may include only a subset of the illustrated subcomponents and therefore represent circuit boards with electronic devices mounted thereon, microchips, or various other integrated circuits. In general, OEIs 100 may provide chip-to-chip, board-to-board, rack-to-rack, or system-to-system intercommunications between processing devices 1301 over external waveguide 125 (e.g., multi-strand fiber optic cable or the like).

The illustrated embodiments of processing devices 1301 each include one or more processors (or central processing units) 1305, system memory 1310, nonvolatile ("NV") memory 1315, a data storage unit ("DSU") 1320, and OEI 100. Processor(s) 1305 is/are communicatively coupled to system memory 1310, NV memory 1315, DSU 1320, and OEI 100 to send and to receive instructions or data thereto/therefrom. In one embodiment, NV memory 1315 is a flash memory device. In other embodiments, NV memory 1315 includes any one of read only memory ("ROM"), programmable ROM, erasable programmable ROM ("EPROM"), electrically erasable programmable ROM ("EEPROM"), or the like. In one embodiment, system memory 1310 includes random access memory ("RAM"), such as dynamic RAM ("DRAM"), synchronous DRAM ("SDRAM"), double data rate SDRAM ("DDR SDRAM"), static RAM ("SRAM"), and the like. DSU 1320 represents any storage device for software data, applications, and/or operating systems, but will most typically be a nonvolatile storage device. DSU 1320 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
   a substrate including a first conductor disposed on a topside of the substrate; and
   an alignment interface mounted on the topside of the substrate for receiving an external waveguide connector from a first side of the alignment interface above the topside of the substrate, the alignment interface including:
   an alignment structure to mate with a corresponding alignment structure of the external waveguide connector to passively align the external waveguide connector;
   a first microlens disposed on the first side of the alignment interface;
   a second microlens disposed on a second side of the alignment interface;
   an optical path passing through the alignment interface between the first microlens and the second microlens; and
   a second conductor disposed on the second side of the alignment interface extending to an edge of the alignment interface to physically contact the first conductor disposed on the substrate to form an electrical connection to the first conductor.

2. The apparatus of claim 1, further comprising an optoelectronic die mounted to the second side of the alignment interface, the optoelectronic die including:
   a first electrical port coupled to the first conductor;
   an optoelectronic device coupled to the first electrical port; and
   a first optical port aligned with the second microlens to optically couple the optoelectronic device to the second microlens and the optical path passing through the alignment interface.

3. The apparatus of claim 2, wherein the second conductor is routed to a bottom edge of the alignment interface to form a surface mount connection with the first conductor on the topside of the substrate.

4. The apparatus of claim 1, further comprising:
   a first plurality of microlenses disposed on the first side of the alignment interface;
   a second plurality of microlenses disposed on the second side of the alignment interface; and
   a plurality of optical paths passing through the alignment interface between the first plurality of microlenses and the second plurality of microlenses.

5. The apparatus of claim 1, wherein at least one of the first or second microlenses is recessed into the alignment interface.

6. The apparatus of claim 1, wherein at least one of the first or second sides of the alignment interface includes protrusions to protect the corresponding first or second microlens from physical contact.

7. The apparatus of claim 1, wherein the alignment interface is made of a material selected from a group consisting of optically transmissive polymer, glass, and quartz.

8. The apparatus of claim 1, wherein the first and second microlenses are formed of the same material as the alignment interface.

9. The apparatus of claim 1, wherein the first and second microlenses comprise a polymer disposed on the alignment interface.

10. The apparatus of claim 1, wherein the alignment structure of the alignment interface comprises at least one cavity in the alignment interface.

11. A method, comprising:
    propagating an electrical signal from a first conductor trace disposed on a substrate to a second conductor trace disposed along a side of an alignment interface mounted on the substrate and into an optoelectronic ("OE") die mounted to the side of the alignment interface;
    emitting an optical signal from the OE die in response to the electrical signal;
    collimating the optical signal;
    propagating the optical signal through the alignment interface without passing through the substrate; and
    launching the optical signal into an external waveguide coupled to the alignment interface.

12. The method of claim 11, wherein launching the optical signal into the external waveguide comprises focusing the optical signal into the external waveguide.

13. The method of claim 12,
    wherein collimating the optical signal comprises passing the optical signal through a first microlens disposed on a first side of the alignment interface, the OE die mounted to the first side,
    wherein focusing the optical signal comprises passing the optical signal through a second microlens disposed on a second side of the alignment interface, the external waveguide coupled to the second side.

14. The method of claim 11, further comprising generating the electrical signal with a circuit device mounted to the substrate.

15. The method of claim 11, wherein the optical signal comprises a first optical signal, the method further comprising:
    receiving a second optical signal from a second external waveguide coupled to the alignment interface;
    collimating the second optical signal
    propagating the second optical signal through the alignment interface; and
    focusing the second optical signal onto an optical receive port.

16. The method claim 15, wherein the electrical signal comprises a first electrical signal, the method further comprising:
    converting the second optical signal to a second electrical signal with an optoelectronic device; and
    propagating the second electrical signal onto the substrate from the alignment interface.

17. The method of claim 16, wherein the optoelectronic device is disposed within the OE die.

* * * * *